(12) United States Patent
Watanabe

(10) Patent No.: US 10,747,768 B2
(45) Date of Patent: Aug. 18, 2020

(54) DATA PROCESSING SYSTEM AND DATA PROCESSING METHOD

(71) Applicant: FUJI XEROX CO., LTD., Tokyo (JP)

(72) Inventor: Masao Watanabe, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 215 days.

(21) Appl. No.: 15/374,191

(22) Filed: Dec. 9, 2016

(65) Prior Publication Data

US 2017/0357694 A1 Dec. 14, 2017

(30) Foreign Application Priority Data

Jun. 14, 2016 (JP) .................................. 2016-118112
Sep. 9, 2016 (JP) .................................. 2016-177109

(51) Int. Cl.
*G06F 16/2455* (2019.01)
*G06F 16/21* (2019.01)

(52) U.S. Cl.
CPC ...... *G06F 16/24568* (2019.01); *G06F 16/217* (2019.01)

(58) Field of Classification Search
None
See application file for complete search history.

(56) References Cited

U.S. PATENT DOCUMENTS

| | | | |
|---|---|---|---|
| 8,429,179 B1 * | 4/2013 | Mirhaji | G06F 17/30312 |
| | | | 707/756 |
| 9,107,565 B2 | 8/2015 | Jain et al. | |
| 9,122,745 B2 * | 9/2015 | Akolkar | G06F 16/3329 |
| 2005/0164725 A1 | 7/2005 | Naito et al. | |
| 2009/0083310 A1 * | 3/2009 | Ballerini | G06F 17/30289 |
| 2010/0106853 A1 | 4/2010 | Kashiyama et al. | |
| 2011/0087685 A1 | 4/2011 | Lin et al. | |
| 2013/0007044 A1 * | 1/2013 | Eshwar | G06F 17/30516 |
| | | | 707/769 |
| 2014/0188936 A1 | 7/2014 | Rambhia et al. | |
| 2015/0227839 A1 | 8/2015 | Joshi et al. | |
| 2015/0324871 A1 * | 11/2015 | Beloglazov | G06Q 30/0282 |
| | | | 705/347 |

FOREIGN PATENT DOCUMENTS

| | | | | |
|---|---|---|---|---|
| EP | 2919133 A1 | 9/2015 | | |
| JP | 2012-516432 | * 12/2012 | ........... | G06F 16/367 |
| JP | 2013-507695 A | 3/2013 | | |
| WO | 2004-019225 A1 | 3/2004 | | |
| WO | 2011044446 A2 | 4/2011 | | |
| WO | 2012/129371 A2 | 9/2012 | | |

OTHER PUBLICATIONS

Apr. 11, 2017 Extended European Search Report issued in European Patent Application No. 16204743.5.
Jun. 23, 2020 Office Action issued in Japanese Patent Application No. 2016-177109.

* cited by examiner

*Primary Examiner* — Charles D Adams
(74) *Attorney, Agent, or Firm* — Oliff PLC

(57) ABSTRACT

There is provided a data processing system. A storing unit stores ontology data. A selection unit selects a data stream including key information corresponding to a query using the ontology data stored in the storing unit, among data streams including key information uniquely given to sensor data. A processing unit processes the selected data stream.

5 Claims, 22 Drawing Sheets

DATA PROCESSING SYSTEM AND DATA PROCESSING METHOD

CROSS-REFERENCE TO RELATED APPLICATIONS

This application is based on and claims priority under 35 U.S.C. § 119 from Japanese Patent Application No. 2016-118112 filed on Jun. 14, 2016 and Japanese Patent Application No. 2016-177109 filed on Sep. 9, 2016.

TECHNICAL FIELD

The present invention relates to a data processing system and a data processing method.

RELATED ART

In recent years, various data processing methods such as stream data middleware, complex event processing (CEP), and stream reasoning have been developed and suggested. In stream data middleware or complex event processing, although real time processing is performed on data by allowing the data to flow in real time in a predefined analysis scenario, a single context is allocated to a single piece of data, that is, a direct processing template is applied to RAW data to process the data and thus, stream data middleware or complex event processing has a disadvantage of not having flexibility. In stream reasoning, data is processed while inferring the data using a resource description framework (RDF) and an ontology as a base, that is, the RAW data is processed after being processed into inferable data, and thus, in stream reasoning, plural ontologies can be allocated to a single piece of data and there is flexibility in data processing. However, when forward inference or backward inference is performed on the RAW data, an amount of data processing is increased and real time performance may be decreased.

SUMMARY

According to an aspect of the embodiments of the invention, there is provided a data processing system including a storing unit that stores ontology data, a selection unit that selects a data stream including key information corresponding to a query using the ontology data stored in the storing unit, among data streams including key information uniquely given to sensor data, and a processing unit that processes the selected data stream.

BRIEF DESCRIPTION OF THE DRAWINGS

Exemplary embodiments of the present invention will be described in detailed based on the following figures, wherein.

DETAILED DESCRIPTION

Hereinafter, an exemplary embodiment of the present invention will be described with reference to the accompanying drawings.

First, description will be made on an ontology serving as a prerequisite for the present exemplary embodiment.

An ontology is a structural framework for organizing information and means representing an entity, idea, and event according to a certain classification system together with characteristics about the entity, idea, and event and a relationship therebetween.

Figure 6:
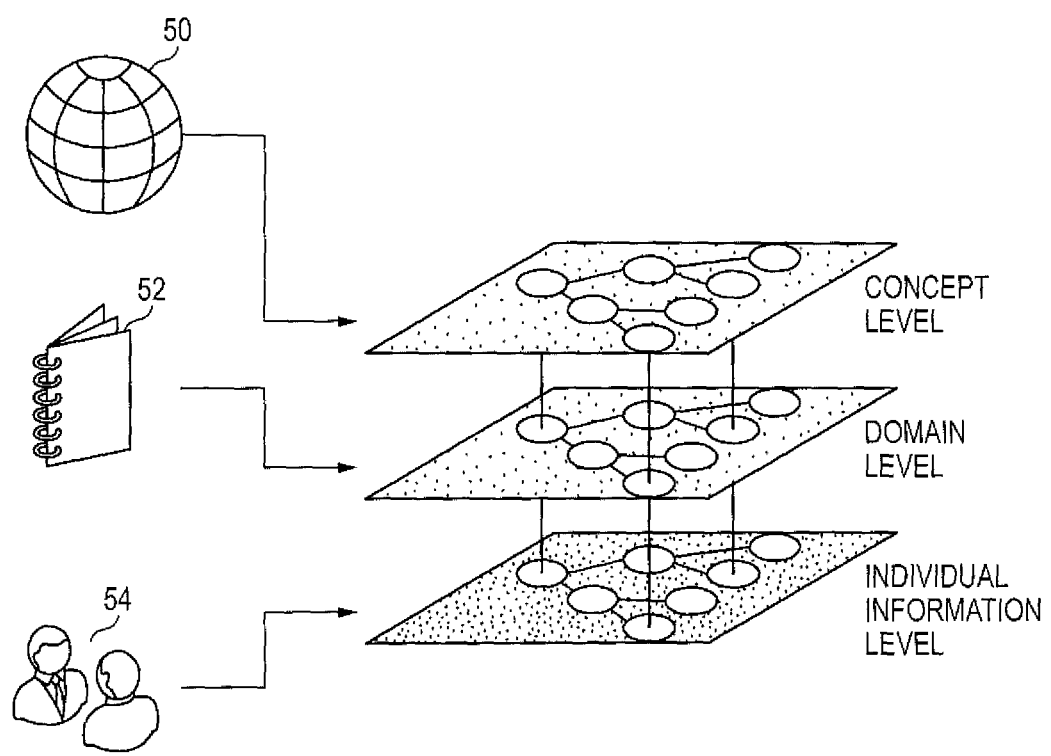
FIG. 6 is an explanatory diagram of a concept of ontology data.

FIG. 6 conceptually illustrates an ontology. Standard data 50, data 52 prepared for each realm, and individual information 54 are collected, relativities of the data and the information are respectively described in a concept level, a domain level, and an individual information level and are respectively structured in the levels. The structured data is used to so as to make it possible for a computer to determine as human beings think and process data. In construction of ontology data, a technique for structuring non-structured data such as a dictionary, standard data, or a document is needed and natural language processing or machine learning is utilized.

Figure 7:
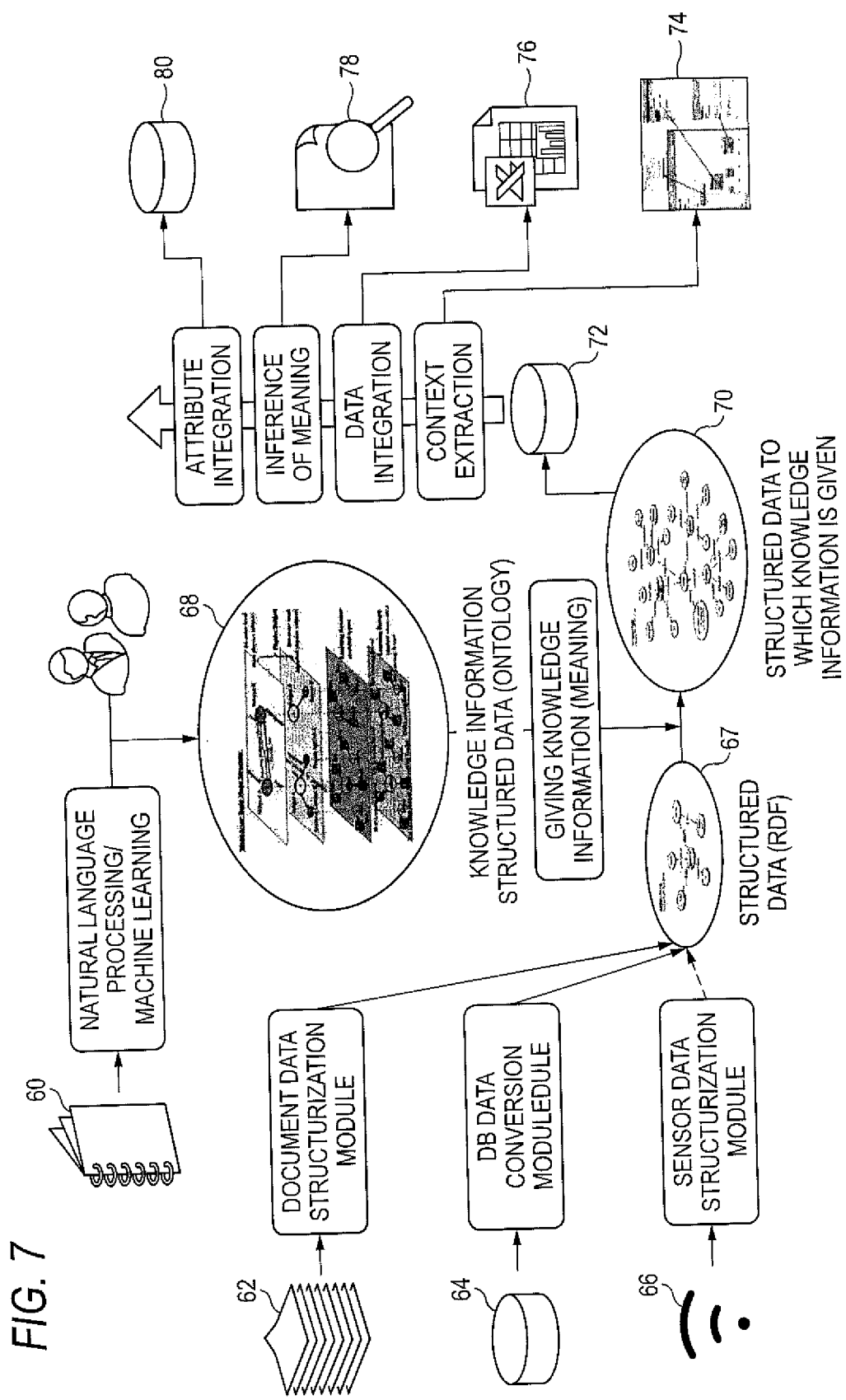
FIG. 7 is a conceptual diagram of a data processing system using ontology data.

FIG. 7 illustrates a conceptual configuration of a general processing system using ontology.

A dictionary, standard data, a work procedure manual 60, domain knowledge, or the like is converted into structured knowledge information data, that is, ontology data 68 by the natural language processing and the machine learning.

On the other hand, non-structured data such as a document 62, structured data such as database data 64, sensor data from a sensor 66, and the like are respectively structured and converted into structured data (RDF) 67 by a document data structurization module, a database data conversion module, and a sensor data structurization module. Here, a resource description framework (RDF) is a framework regarding an expression method of meta data.

The structured data 67 and the ontology data 68 are supplied to an inference engine and subjected to a matching process to thereby obtain structured data 70 to which knowledge information is given. The structured data 70 to which knowledge information is given is stored in a database 72 and provided to various processing. Various processing are processing which becomes possible when knowledge information is given and include, for example, generating a knowledge information visualization module 74 by extraction of context (various information needed to execute a program), generating secondary data 76 which is in conformity to a situation by data integration, performing retrieval of meaning 78 by inference of meaning, reconstructing data 80 for a customer database by attribute integration, or the like.

In the processing system described above, as inference using the structured data 67 and the ontology data 68, although stream reasoning processing for processing RAW data into data capable of being subjected to inference processing and performing processing the data while inferring the data is known, as previously described, there is a problem that a data processing amount is increased and real time performance is reduced.

In the present exemplary embodiment, a processing scheme, in which processing is divided into inference processing and RAW data processing and the inference processing is executed and necessary RAW data is selected in the first step and the selected RAW data is processed in the second step, is used.

Next, description will be specifically made on a data processing system of the present exemplary embodiment by using sensor data from various sensors as an example. Such a data processing system may be applied to a so-called Internet of Things (IoT) but is not necessarily limited thereto.

In the present exemplary embodiment, a "module" or an "engine" means a software component, a hardware component or the like capable of being logically separated. Accordingly, in the present exemplary embodiment, the module means a module in a computer program as well as a module in a hardware configuration. The module may correspond to functionality in a one-to-one relationship, but a single module may be configured by a single program and also plural modules may be configured by a single program. Plural modules may be executed by a single processor or computer and may also be executed by plural processors or computers in a distributed or parallel environment. In the processing by each module, information which becomes a target is read from a storage device, is subjected to processing performed by a processor such as a CPU, and then a processing result is output and written to the storage device. The storage device includes a HDD, a RAM, a register within a CPU, or the like.

In the present exemplary embodiment, "inference" means that matching with ontology data is performed so as to give knowledge information, that is, meaning to structured data.

<System Configuration>

Figure 1:
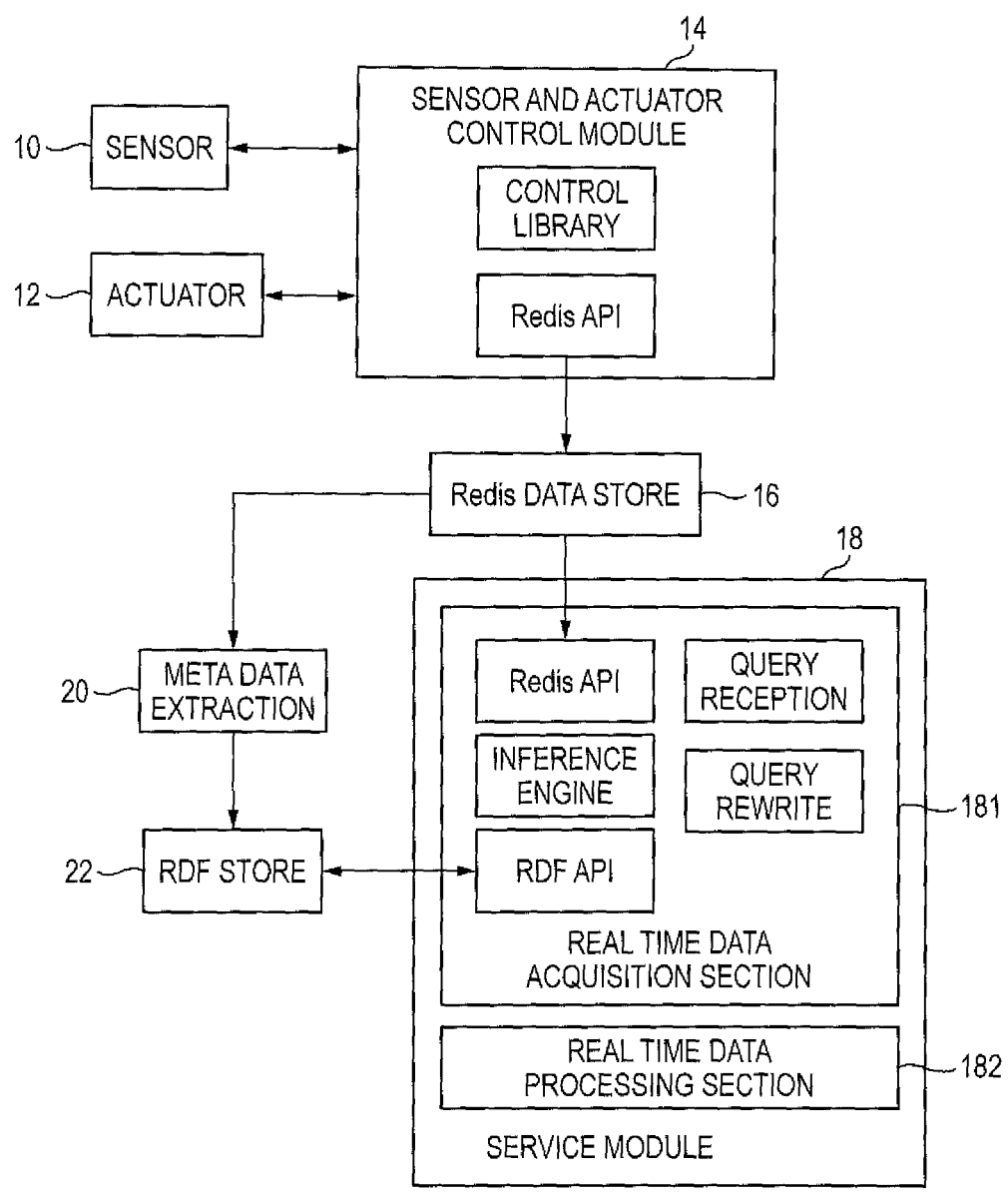
FIG. 1 is a diagram illustrating a configuration of a data processing system of an exemplary embodiment.

FIG. 1 is a diagram illustrating a configuration of a data processing system in the present exemplary embodiment. The system receives a signal from a sensor or an actuator and performs processing on the signal. The data processing system includes a sensor and actuator control module 14, a Redis data store 16, a service module 18, a meta data extraction module 20, and a RDF store 22. The sensor and actuator control module 14, the service module 18, and the meta data extraction module 20, for example, are implemented by a computer program of a single computer. Otherwise, the modules may also be respectively implemented by computer programs of separate computers. The Redis data store 16 and the RDF store 22 are implemented by a database accessible from a computer.

The sensor and actuator control module 14 are connected to a sensor 10 or an actuator 12 so as to transmit and receive data with wired or wireless connection. The sensor and actuator control module 14 includes a control library for controlling the sensor 10 or the actuator 12 and a Redis API which converts received data into data of a key/value format in real time and stores the data in a Redis data store 16. Here, a remote dictionary server (Redis) is software capable of constructing a key-value store (KVS) on a memory and the KVS is a database in which a corresponding unique label (key) is set for certain data (value) intended to be saved and the corresponding label and data are saved in pairs. The Redis constructs the KVS on a main memory of a computer and enables data to be saved or read from an external program. The Redis API specifically generates a key information bit string using a predetermined algorithm based on a point in time and a device ID and gives the key information bit string to data so as to convert the data into data of a key/value format to be stored in the Redis data store 16. The Redis API stores a correspondence relationship between the generated key information and the device ID as a table. Besides, the Redis API may generate a key information bit string using an encryption protocol such as a DEC or MD5 hash, or a SHA-1 hash and gives the key information bit string to data, and furthermore, may also generate a key information bit string at random and gives the key information bit string to data.

The Redis data store 16 sequentially stores data (RAW data), which is converted into a key/value format, from the sensor and actuator control module 14.

The meta data extraction module 20 extracts meta data from RAW data of a key/value and structures the RAW data. The meta data extraction module 20 structures the RAW data into subject information, subject attribute information, object information, object attribute information, and environment information. The subject information is key information which is uniquely given. The structured data is stored in the RDF store 22.

The RDF store 22 functions as a storing unit storing ontology data and stores separately constructed ontology data. The ontology data are prepared by structuring a dictionary or a work procedure manual by natural language processing and machine learning. The natural language processing is included a morpheme analysis and a dependency analysis. The ontology data is generally categorized into pieces of data within two realms. The first piece of ontology data is common ontology data obtained by being commonly used for information such as basic motions of human being or an individual application such as an attribute library of a sensor and the second piece of ontology data is a local ontology data configured from individual information (information prepared from a work procedure manual or the like). The RDF store 22 acquires a table in which the correspondence relationship between the device ID and the key information maintained by the sensor and actuator control module 14 and associates the key information with the ontology data.

The service module 18 receives a query and performs two-step processing on the RAW data according to the ontology data stored in the RDF store 22. The service module 18 includes a real time data acquisition section 181 which executes a first step of selecting a data stream and a real time data processing section 182 which executes a second step of processing the selected data stream.

The real time data acquisition section 181 cut outs a stream data channel at arbitrary timing to acquire a data stream from the RAW data stored in the Redis data store 16. The real time data acquisition section 181 includes a query receiving section, a query rewriting section, a Redis API, an inference engine, and a RDF API.

The query receiving section receives a query.

The RDF API accesses the RDF store 22 to acquire the ontology data.

The inference engine infers key information from the query and the ontology data. That is, a query intended to be subjected to real time processing, for example, a motion analysis of a specific machine type and ontology data of basic motions are subjected to matching and key information matched to the ontology data of basic motions is extracted. The query rewriting section removes unnecessary information from the query based on inferred key information and rewrites the query (rewriting). Query rewrite is a known technique for developing a query into primitive queries.

The Redis API selects a stream data channel including the corresponding key information from the Redis data store 16 using the rewritten query.

The real time data processing section 182 performs data processing on the selected RAW data.

In the system of the present exemplary embodiment, although data processing is performed by the sensor and actuator control module 14 and the service module 18, plural these modules may also exist and in a case where plural sensor and actuator control modules 14 and plural service modules 18 exist, these modules may also operate in parallel and asynchronously.

Figure 2:
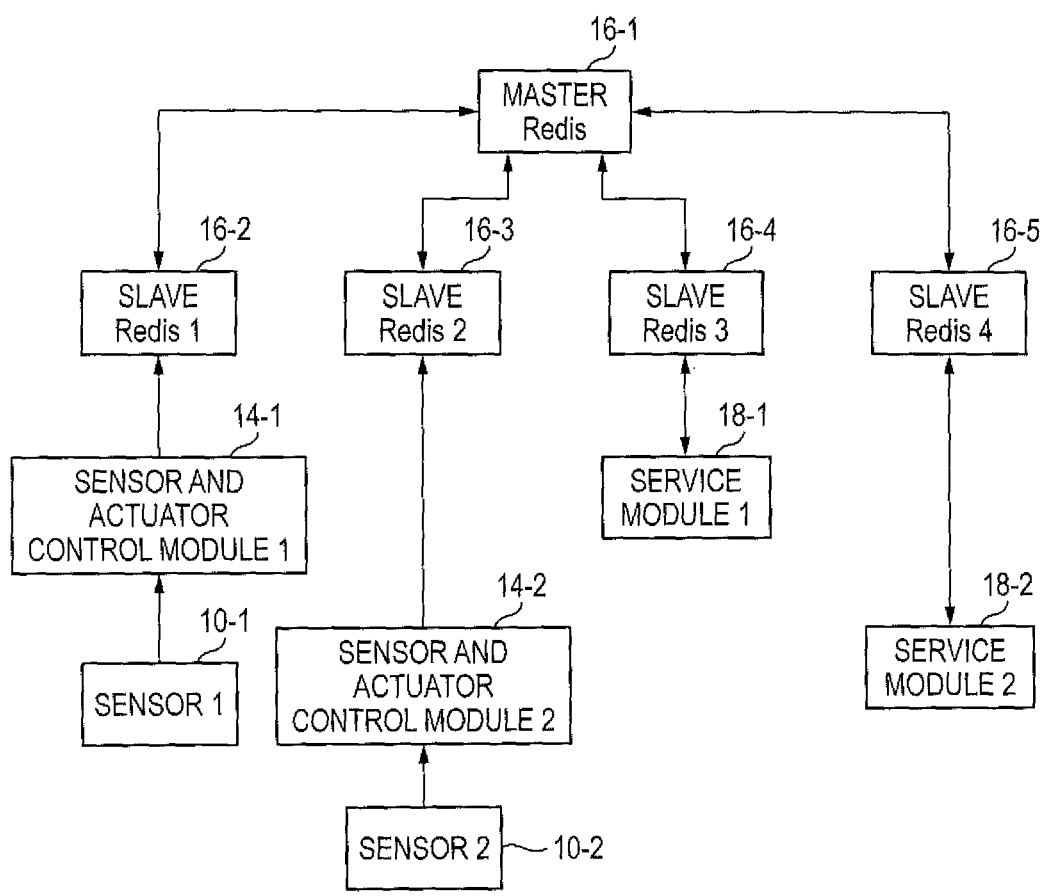
FIG. 2 is a (second) diagram illustrating the configuration of the system of the exemplary embodiment.

FIG. 2 is a diagram illustrating an example of a configuration of the system in a case where plural sensor and actuator control modules 14 and plural service modules 18 exist.

As the sensor and actuator control module 14, a sensor and actuator control module 14-1 (sensor and actuator control module 1) and a sensor and actuator control module 14-2 (sensor and actuator control module 2) are provided. Data from a sensor 10-1 (sensor 1) is supplied to the sensor and actuator control module 14-1 and data from a sensor 10-2 (sensor 2) is supplied to the sensor and actuator control module 14-2 (sensor and actuator control module 2).

Plural Redis data stores 16 are also provided in master-slave connections and a Redis data store 16-1 (master Redis), a Redis data store 16-2 (slave Redis 1), a Redis data store 16-3 (slave Redis 2), a Redis data store 16-4 (slave Redis 3), and a Redis data store 16-5 (slave Redis 4) are provided. All of the Redis data store 16-2 to Redis data store 16-5 are connected to the Redis data store 16-1. The sensor and actuator control module 14-1 registers the RAW data, for example, in the Redis data store 16-2 and the sensor and actuator control module 14-2 registers the RAW data, for example, in the Redis data store 16-3.

On the other hand, as the service module 18, a service module 18-1 (service module 1) and a service module 18-2 (service module 2) are provided. The service module 18-1 accesses the Redis data store 16-4 and performs data processing in parallel and asynchronously with other modules and the service module 18-2 also accesses the Redis data store 16-5 and performs data processing in parallel and asynchronously with other modules.

Next, a first step executed in the real time data acquisition section 181 and a second step executed in the real time data processing section 182 will be described in more detail.

<First Step>

Figure 3:
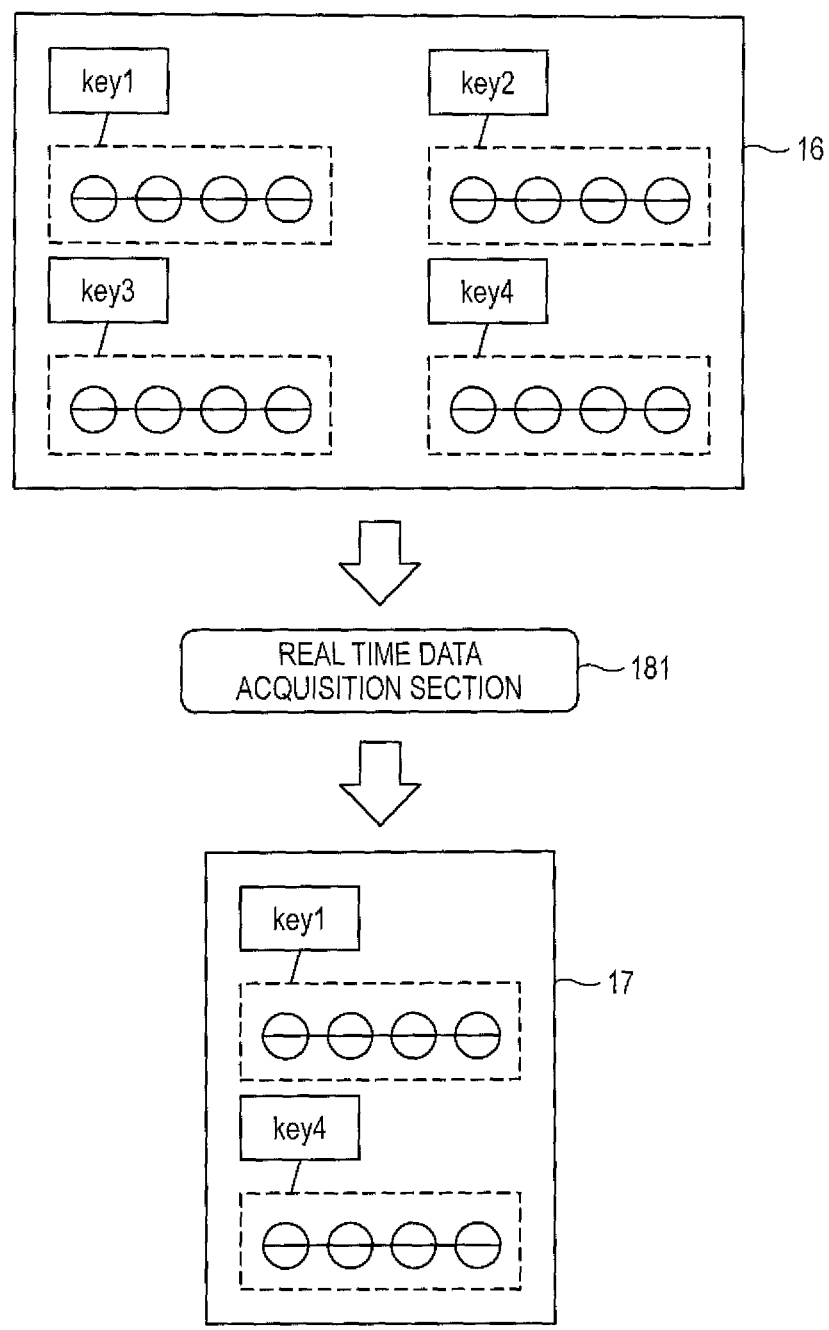
FIG. 3 is an explanatory diagram illustrating processing by a real time data acquisition section of the exemplary embodiment.

FIG. 3 illustrates a flow of processing in the real time data acquisition section 181 of the service module 18. In the processing, key information corresponding to a query is inferred and a data stream corresponding to the inferred key information is selected.

Raw data of a key/value is stored in the Redis data store 16. In the figure, as an example of the stored RAW data, key 1/data stream 1 key 2/data stream 2 key 3/data stream 3 key 4/data stream 4 are illustrated. The key 1 is key information uniquely given to the data stream 1 and for example, is prepared based on a point of time and a device ID. The key 2, key 3, and key 4 are also similarly prepared.

The real time data acquisition section 181 cut outs a data stream including corresponding key information according to a received query. For example, in a case where the query corresponds to a motion analysis of a specific machine type, the real time data acquisition section 181 infers key information coincident with ontology data of basic motions included in the context and selects a data stream including the key information obtained by inference. When the key 1 and the key 4 of the RAW data are regarded as corresponding key information, the real time data acquisition section 181 selects the key 1/data stream 1 and the key 4/data stream 4 from the Redis data store 16. In FIG. 3, the selected RAW data is represented as data 17.

Figure 4:
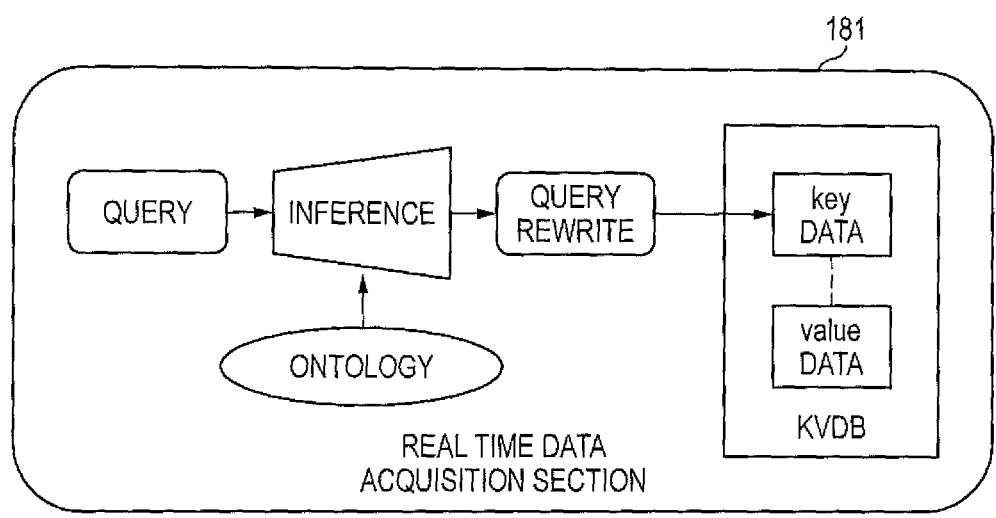
FIG. 4 is a functional block diagram of the real time data acquisition section of the exemplary embodiment.

FIG. 4 is a functional block diagram of the real time data acquisition section 181.

A desired query received by the query receiving section is supplied to an inference engine. Ontology data acquired from the RDF store 22 by the RDF API is supplied to the inference engine. The inference engine infers key information which matches the ontology data based on the query and the ontology data. The query rewriting section removes a noise from the key information obtained by inference to rewrite a query. The Redis API acquires the data stream including the corresponding key information from the Redis data store 16 as a key-value database (KVDB) using the rewritten query.

<Second Step>

Figure 5:
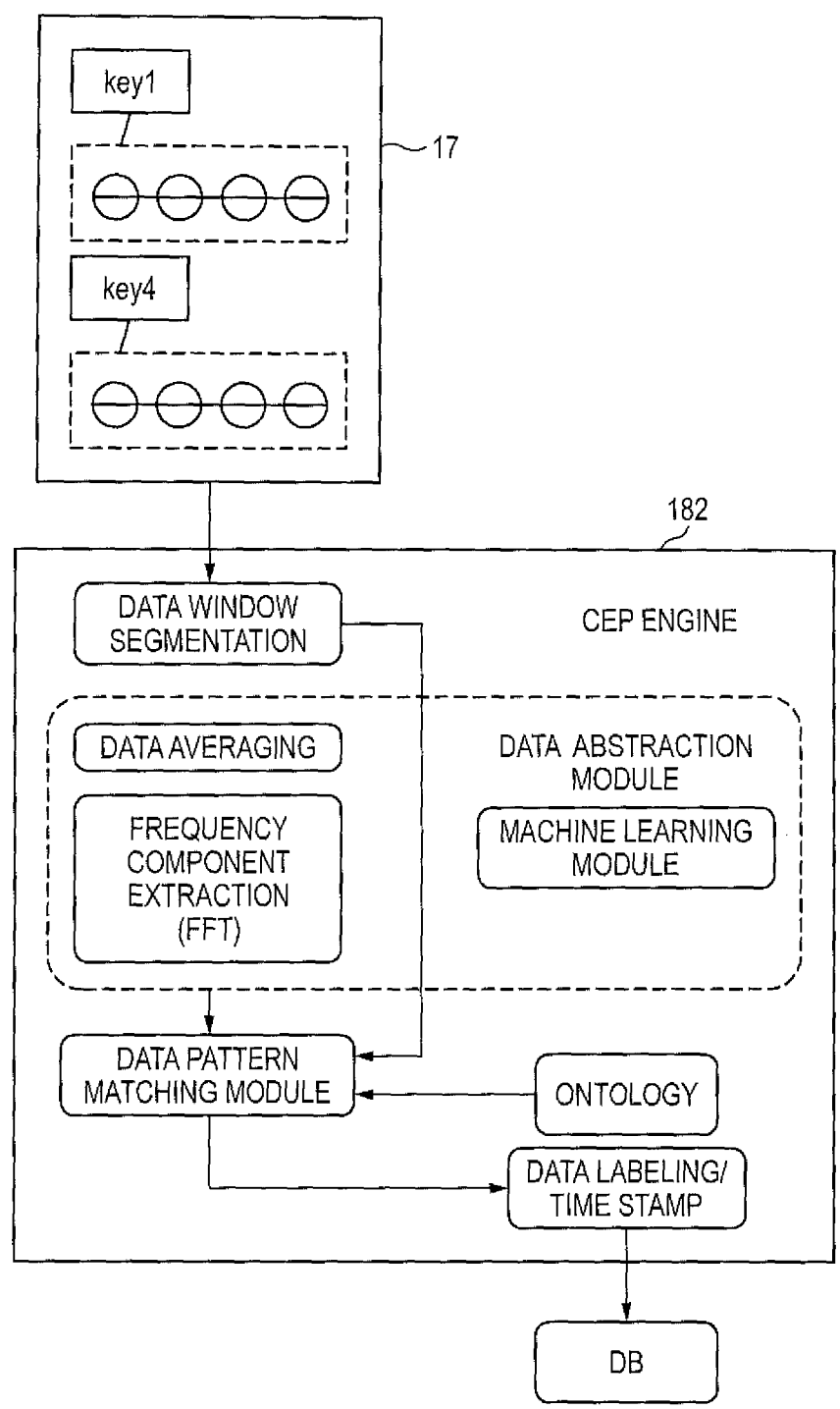
FIG. 5 is a functional block diagram of a real time data processing section of the exemplary embodiment.

FIG. 5 is a functional block diagram of the real time data processing section 182 of the service module 18. In the second step, the RAW data 17 selected in the first step is processed.

The real time data processing section 182 once converts the RAW data 17 into data capable of being subjected to inference processing and performs data processing on the data. For that reason, the real time data processing section 182 includes a CEP engine and the CEP engine further includes a data window segmentation module, a data abstraction module, a data pattern matching module, and a data labeling/time stamp module.

The key 1/data stream 1 and the key 4/data stream 4 selected by the real time data acquisition section 181 are supplied to the CEP engine.

The data window segmentation module sets a window while sequentially moving a window on a time axis and sequentially supplies data within the window to the data abstraction module.

The data abstraction module includes a frequency component extracting module, a data averaging module, and a machine learning module and performs conversion processing such as frequency component conversion (Fourier transform) or conversion of average on the data within the window to generate abstraction data. Plural pieces of abstraction data may be generated from a single piece of RAW data. The machine learning module structures the abstraction data into quaternary fact data based on the extracted data. The quaternary fact data is specifically time information/subject information/attribute information/sensor data. The time information allocates time stamp information. The subject information allocates information (ID or the like) of sensor mounting main body. The attribute information allocates predefined attribute information or an attribute affixed to data conversion processing to the sensor. The sensor data is abstracted data itself.

The data pattern matching module performs matching of the structured abstraction data with the ontology data acquired from the RDF store 22 to perform inference.

Generation of ontology data when performing inference is as follows, for example, when a work procedure manual is used as an example.

First, a work procedure manual is computerized by OCR processing or the like. Next, the work procedure manual is subjected to natural language processing to be converted into quaternary rule data. That is, morphemic decomposition of the work procedure manual is performed to be decomposed into nouns, verbs, and the like and nouns, verbs, and the like are allocated in a sequence ID/subject/predicate/object format in a sequence appearing in the work procedure manual to be converted into quaternary rule data by taking into consideration dependency. In this case, appearance frequency of the rule data is evaluated and the rule data may be given as a fifth piece of quinary data.

Next, a series of sequential works are connected by attributes in order of work procedure manual and plural procedures are collected and labeled in a generic concept to prepare work procedure ontology data.

The data labeling/time stamp module gives a label and time stamp to data subjected to matching processing by the data pattern matching module and registers the data in the database 70. The data registered in the database 70, that is, structured data to which knowledge information is given by ontology data are provided to various processing.

As such, although the real time data processing section 182 performs data processing after the RAW data is once converted into inferable data, instead of this, the real time data processing section 182 may associates a data processing routine template, which processes the RAW data, with ontology data to be stored in the RDF store 22 and in the first step, the RAW data as well as the data processing routine template are simultaneously acquired from the RDF store 22 and in the second step, the RAW data may be processed by the selected data processing routine template. Otherwise, both the data processing and the two-step processing described above may also be appropriately combined to be executed.

A data processing method in the second step may be summarized as follows. (A) once converting the RAW data into capable of being subjected to inference processing and performing data processing while inference is progressed, (B) performing data processing on the RAW data by the selected data processing routine template, and (C) combining (A) and (B).

In the present exemplary embodiment, processing is performed in two steps of a first step in which the data stream to be processed is selected using key information (real time data acquisition) and a second step in which data processing is performed on the selected data stream (real time data processing), the data streams to be subjected to the real time processing are narrowed to efficiently process data, and thus, in a case where the ontology data of the work procedure manual is used as ontology data, data in a production site may be analyzed in real time to detect occurrence of a failure in real time to thereby make it possible to rapidly respond. When a failure occurs, data until the abnormality occurs is traced retroactively so as to make it possible to analyze causes of a failure. A difference in works by a person may be extracted to achieve improvement of workability. Furthermore, a work state may be fed back to a worker to achieve continuous improvement in work.

Next, processing of the present exemplary embodiment will be described in more detail.

Figure 8:
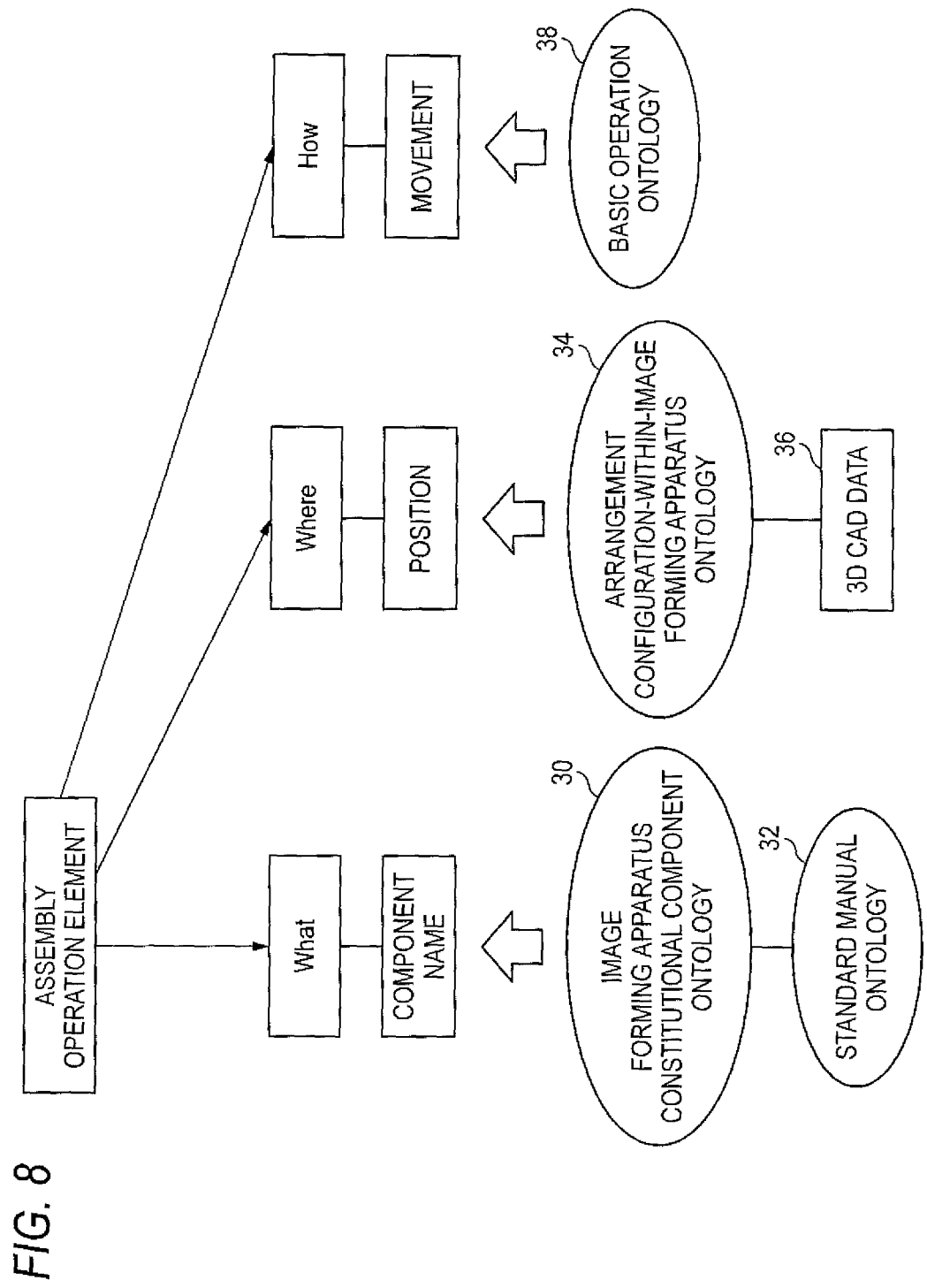
FIG. 8 is an explanatory diagram of ontology of assembly operation element.

FIG. 8 illustrates, as an example of ontology data, ontology data of an assembly operation element of an image forming apparatus equipped with a function of a certain product, for example, a copying machine, a printer, a facsimile or the like.

The assembly operation element is configured from wordings of "What", "Where", and "How" and the "What" corresponds to a component name, the "Where" corresponds to a position, and the "How" corresponds to a movement. Sensor data may exist in each of the "What", "Where", and "How".

On the other hand, as ontology data, image forming apparatus constitutional component ontology 30 describing information of a component of an image forming apparatus, standard manual ontology 32 describing a general configuration of the image forming apparatus, arrangement configuration-within-image forming apparatus ontology 34 describing arrangement information of the component of the image forming apparatus, 3D CAD data 36 of the image forming apparatus, and basic operation ontology 38 describing basic operations of an assembly worker in assembling the image forming apparatus are prepared and, a component name of an assembly operation element is inferred using image forming apparatus constitutional component ontology 30 and manual ontology 32 and sensor data corresponding to the component name is extracted. A position of the assembly operation element is inferred using arrangement configuration-within-image forming apparatus 34 and 3D CAD data 36 and sensor data corresponding to the position is extracted. A movement of the assembly operation element is inferred using basic operation ontology 38 and sensor data corresponding to the movement is extracted.

Figure 9:
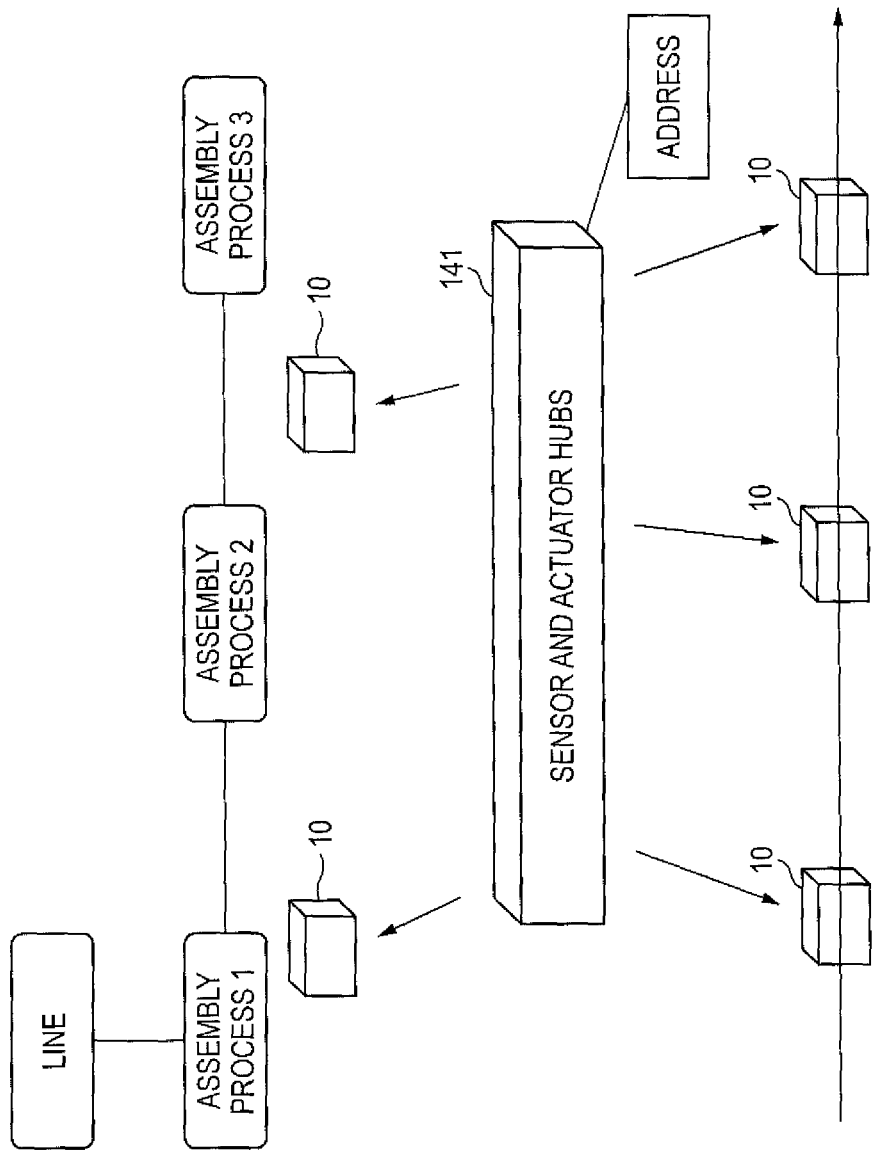
FIG. 9 is an explanatory diagram of an arrangement of sensor and actuator hubs.

FIG. 9 illustrates a physical arrangement of sensor and actuator hubs as an example of the sensor and actuator control module 14.

An assembly line of the image forming apparatus is configured from plural assembly processes and only an assembly process 1, an assembly process 2, and an assembly process 3 are exemplarily illustrated in FIG. 9. The sensor 10 is respectively installed in the assembly process 1, the assembly process 2, and the assembly process 3. In each assembly process, an assembly worker exists and the sensor 10 detecting the assembly worker is also installed. Data detected by the sensors is supplied to sensor and actuator hubs 141 installed in every plural processes. The sensor and actuator hubs 141 may be installed in each process. The sensor and actuator hubs 141 are given with an unique address and even when plural sensor and actuator hubs 141 exist, any of the sensor and actuator hubs 141 may be specified by the address.

When data is received from each sensor 10, the sensor and actuator hubs 141 convert the received data into a piece of key/value type data in real time to be stored in the KVS.

Figure 10:
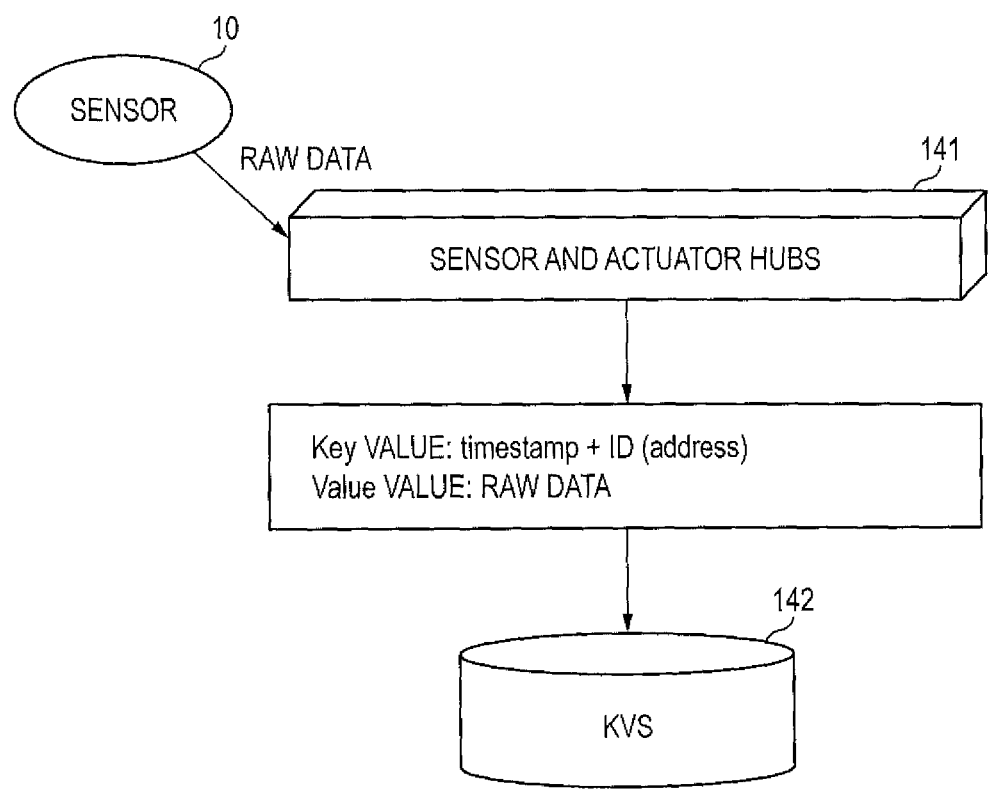
FIG. 10 is a diagram for explaining how a key value is given.

FIG. 10 schematically illustrates processing of the sensor and actuator hubs 141. RAW data from the sensor 10 is transmitted to the sensor and actuator hubs 141 and the sensor and actuator hubs 141 give a timestamp and an ID (address of sensor and actuator hubs 141) to the RAW data and converts the RAW data into a piece of key-value type data which uses RAW data as a value of value to be stored in the KVS 142. The KVS 142, as previously described, is a database in which a unique sign (key) corresponding to arbitrary data intended to be stored is stored in a pair and is configured in a computer memory by the Redis API.

Figure 11:
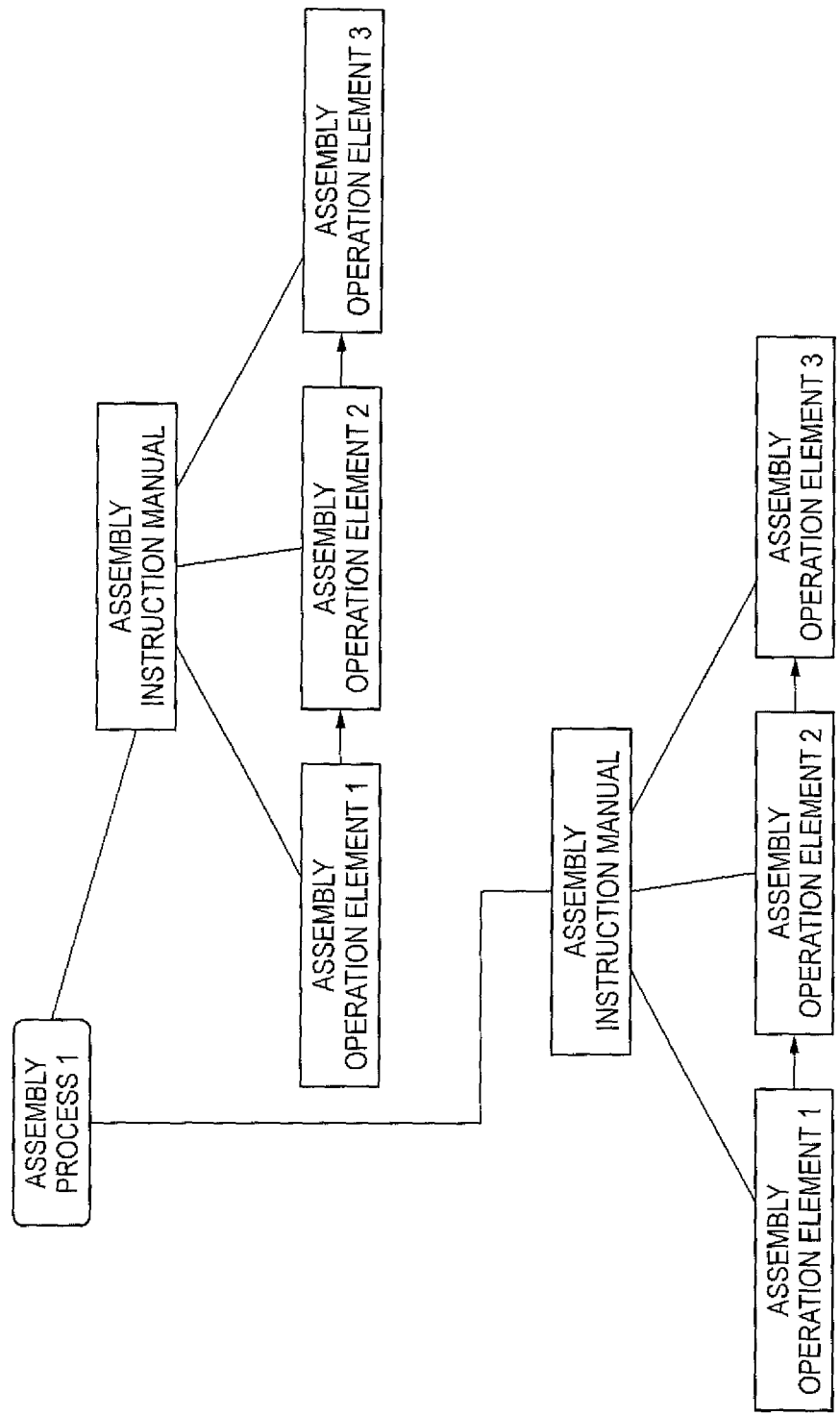
FIG. 11 is a diagram illustrating a relationship between an assembly process and an assembly instruction manual.

FIG. 11 schematically illustrates a relationship between an assembly process and an assembly instruction manual. As illustrated in FIG. 9, although the assembly line is configured from plural assembly process 1, assembly process 2, assembly process 3, and . . . , for example, the assembly process 1 corresponds to assembly instruction manual to be executed in the assembly process 1. Plural assembly instruction manuals may exist as illustrated in FIG. 11. In the assembly instruction manual, plural assembly operation elements are described in time series.

The assembly operation elements are assembly operation element 1 assembly operation element 2 assembly operation element 3, and the like. Each assembly operation element, as illustrated in FIG. 8, prescribes the "What", "Where", and "How" and the component name, position, and operation correspond to the "What", "Where", and "How", respectively.

This means that when an assembly operation element is obtained, an assembly instruction manual corresponding to the assembly operation element is obtained and when the assembly instruction manual is obtained, an assembly process corresponding to the assembly instruction manual is obtained. In the assembly process, the sensor and actuator hubs 141 are installed in a one-to-one relationship or a many-to-one relationship (see FIG. 9) and thus, when a corresponding assembly process is obtained, the sensor and actuator hubs 141 corresponding to the assembly process are obtained.

Figure 12:
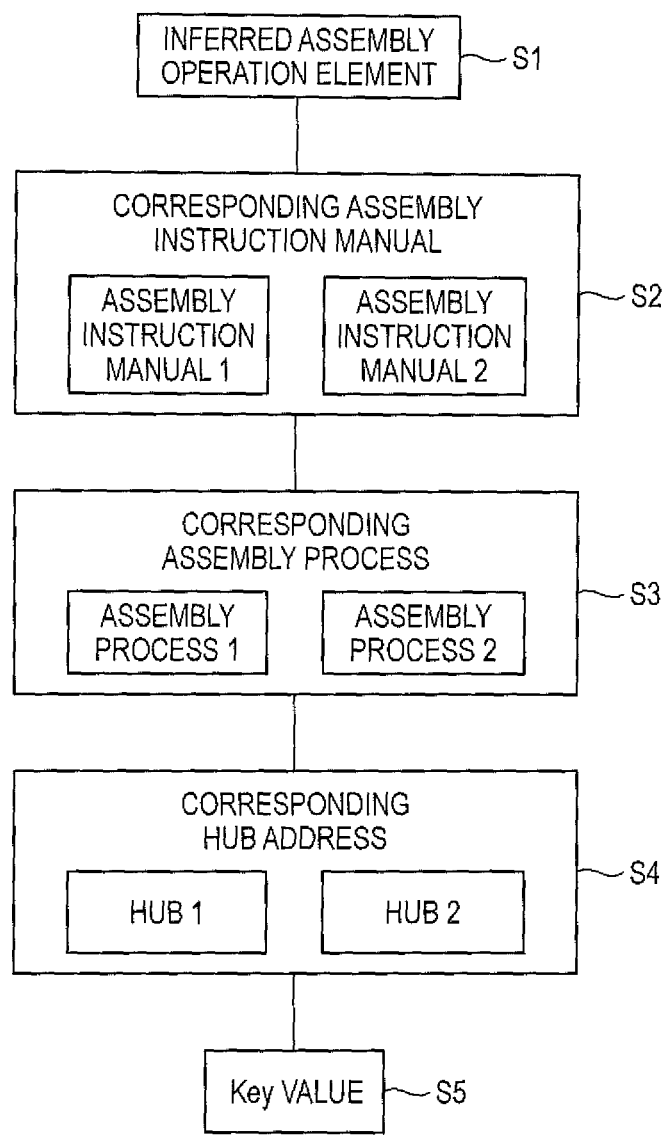
FIG. 12 is an explanatory diagram for illustrating an inference of a key value.

FIG. 12 schematically illustrates an inference of a Key value executed by an inference engine of the real time data acquisition section 181.

An assembly operation element is detected and extracted from a necessary technical standard, a component, a region in a 3D CAD, and an assembly operation using SPARQL or the like (S1). The SPARQL is a query language for retrieving and manipulating data described by the resource description framework (RDF).

Next, an assembly instruction manual corresponding to the assembly operation element is extracted from the retrieved and extracted assembly operation element (S2).

Next, an assembly process corresponding to the assembly instruction manual is extracted from the extracted assembly instruction manual element (S3).

Next, an address of the sensor and actuator hubs 141 corresponding to an extracted assembly process is specified from the assembly process (S4).

Next, a Key value is extracted from the specified address (S5). As previously described, the key value is configured from the timestamp and the ID (address) and thus, an address is designated so as to make it possible to uniquely obtain a key value corresponds to the address.

By doing as described above, when the key value is inferred, the real time data acquisition section 181 cuts out data stream having the corresponding key value from the Redis data store 16 and supplies data stream to the real time data processing section 182.

Figure 13:
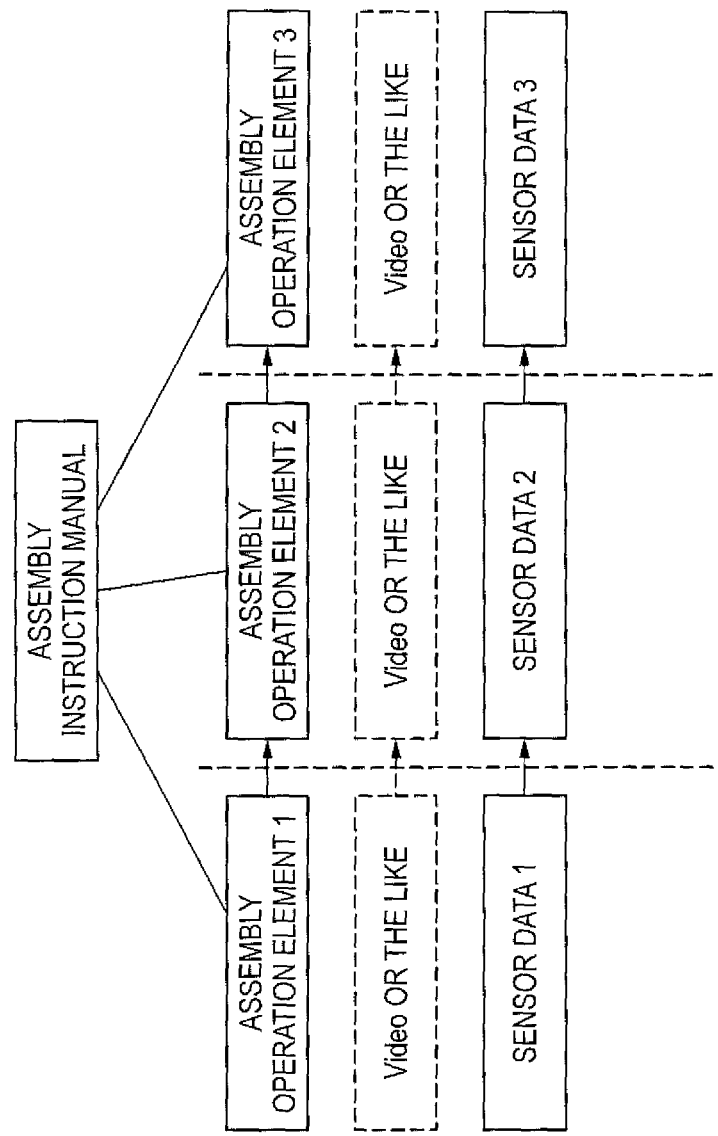
FIG. 13 is an explanatory diagram of sensor data partitioning.
Figure 14:
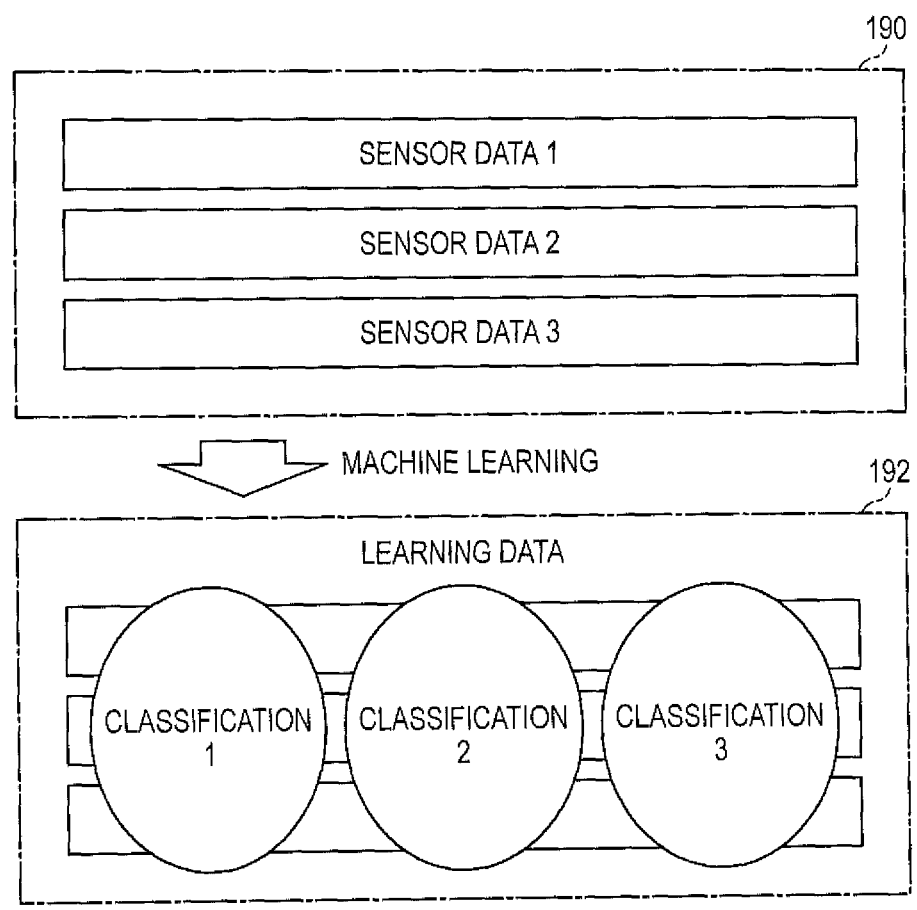
FIG. 14 is an explanatory diagram of sensor data learning.

FIG. 13 and FIG. 14 schematically illustrate processing in the real time data processing section 182. The assembly instruction manual prescribes plural assembly operation elements, assembly operation element 1 assembly operation element 2 assembly operation element 3. On the other hand, when information such as a video, which corresponds to each assembly operation element, or the like exists, sensor data obtained from the sensor 10 is partitioned to be associated with each assembly operation element and each piece of sensor data using the video or the like. For example, sensor data is partitioned into a piece of sensor data 1, a piece of sensor data 2, and a piece of sensor data 3 using the video and is associated with assembly operation element 1 . . . sensor data 1
assembly operation element 2 . . . sensor data 2
assembly operation element 3 . . . sensor data 3.

Next, as illustrated in FIG. 14, sensor data is subjected to machine learning by using partitioned sensor data (sensor data 1, sensor data 2, sensor data 3) as teacher data 190 and learning data 192 is obtained by being classified into plural categories. Specifically, as vector data, a degree of similarity of operation elements with each classification result of operation elements is calculated. For example, operation elements are respectively classified into classification 1, classification 2, and classification 3, and the classification 1 is, classification 1=[:assembly operation element 1[0.1, 0.2], :assembly operation element 2[0.3, 0.2], :assembly operation element[0.8, 0.7]] or the like. Here, a degree of similarity with the assembly operation element 1 is represented as a vector [0.1, 0.2]. The degrees of similarity with the assembly operation elements 2 and 3 are similar. The learning data 192 obtained by being subjected to machine learning becomes a comparison target with actual sensor data.

Figure 15:
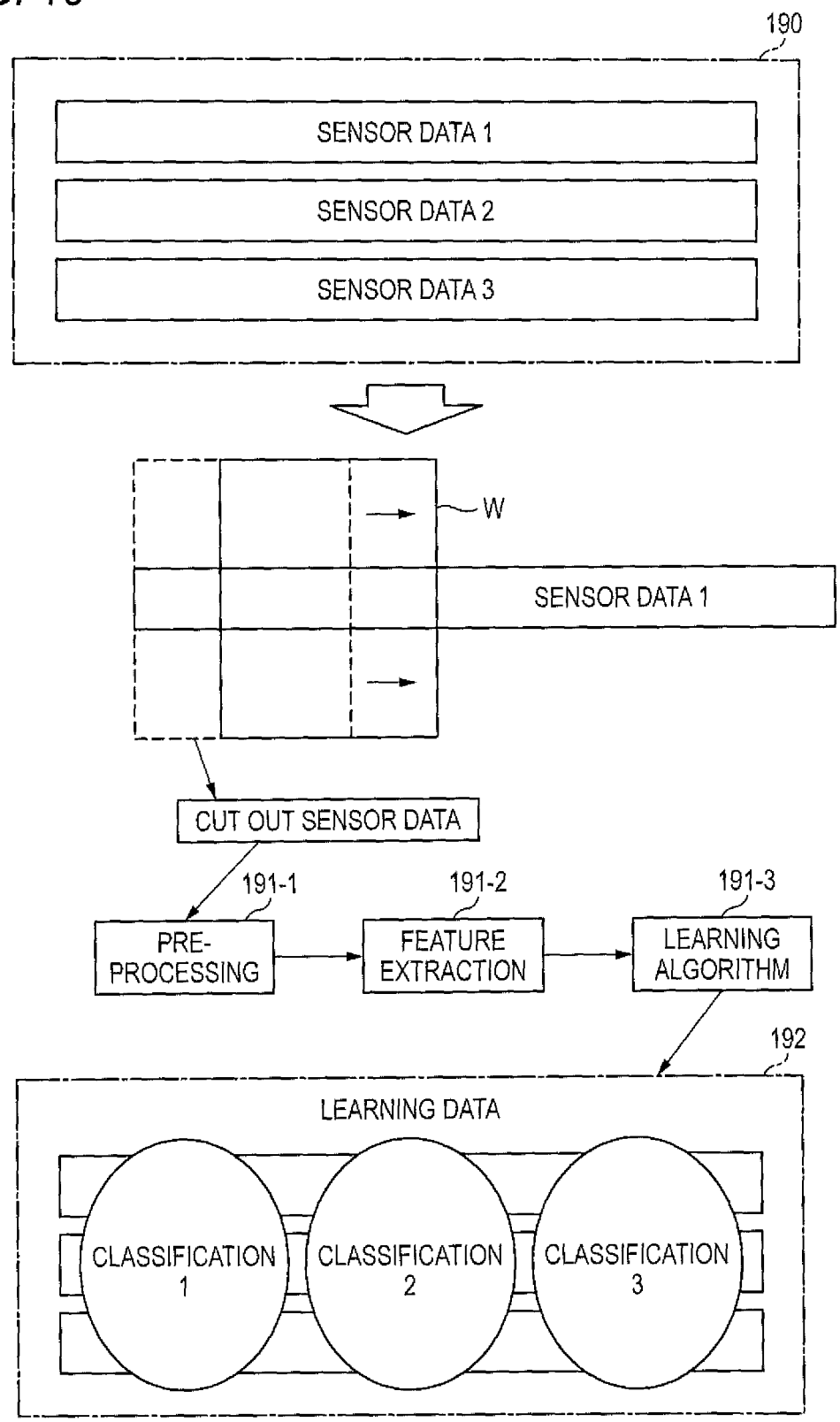
FIG. 15 is an explanatory diagram of details of sensor data learning.

FIG. 15 illustrates a machine learning method in more detail. The teacher data 190 constituted of sensor data 1, sensor data 2, sensor data 3, . . . is cut out into sensor data having a predetermined time width by causing a window W which is set in advance to be slid on the time axis.

Next, sensor data being cut out in a predetermined time width is supplied to pre-processing unit 191-1, is subjected to various preprocessing such as filtering processing (high frequency filter, low frequency filter, or the like), differentiation and integration processing, edge detection, or the like, and is supplied to a feature extraction unit 191-2. The feature extraction unit 191-2 extracts a feature of sensor data waveform by a fast fourier transform (FFT), peak detection, zero cross counting, or the like. The extracted feature is further supplied to a learning algorithm unit 191-3. In the learning algorithm unit 191-3, known machine learning algorithm, for example, the neural network, deep neural network, and recursive neural network may be used. As a classification method, Adaptive Naive Bayes Classifier, K-Nearest Neighbor, AdaBoost, Decision Trees, Dynamic Time Wrapping, Support Vector Machine, Hidden Markov Model Gaussian Mixture Model, or the like may be used. In the learning algorithm unit 191-3, sensor data is subjected to machine learning so as to obtain the learning data 192.

Figure 16:
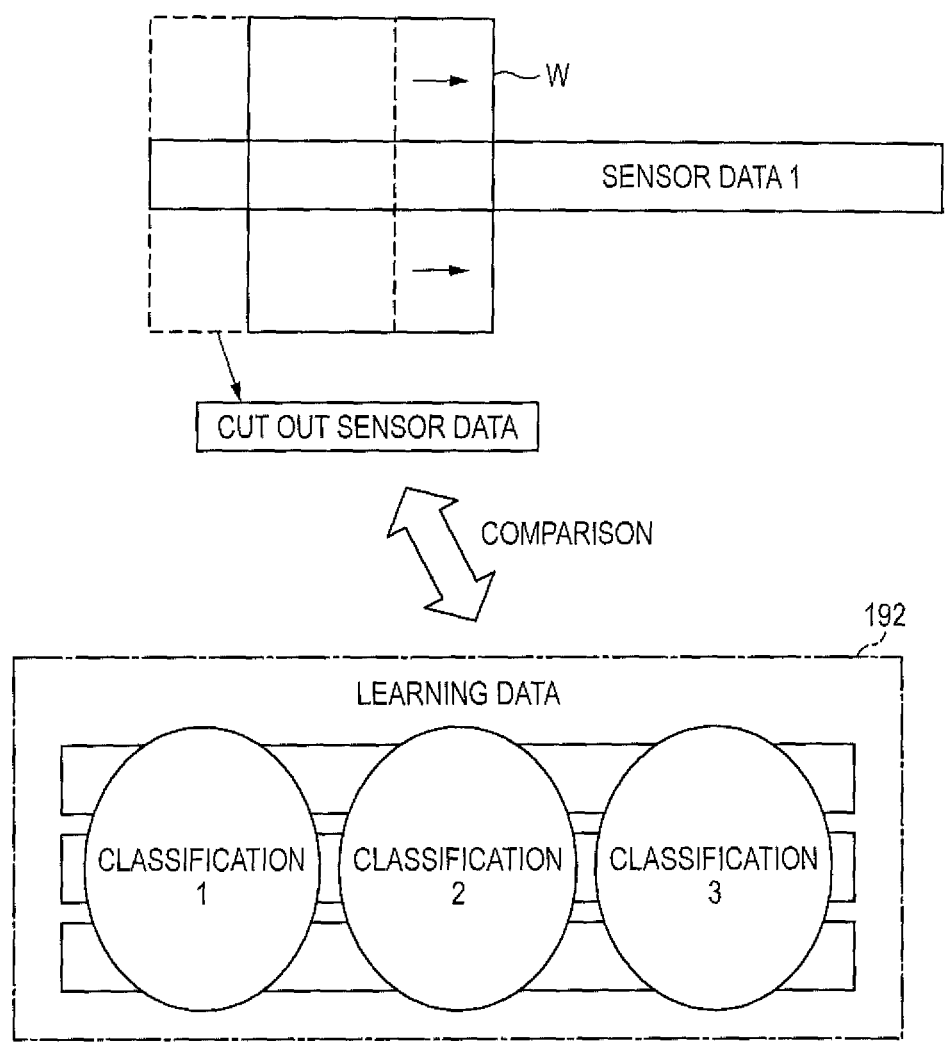
FIG. 16 is an explanatory diagram of a comparison of sensor data with learning data.

FIG. 16 schematically illustrates processing of a comparison of sensor data sequentially obtained from the sensor 10 with learning data 192. Similar to teacher data 190, sensor data is cut out into pieces of sensor data having a predetermined time width by causing the window W which is set in advance to be slid on the time axis. The piece of cut out sensor data is compared with learning data 192 to generate vector data.

For example, the piece of cut out sensor data is compared with the learning data 192 and when a rate of each classification is

[:classification 1 0.3:classification 2 0.1:classification 3 0.6], the piece of cut out sensor data is calculated as, [:assembly operation element 1[0.3, 0.2]:assembly operation element 2[0.1, 0.2]:assembly operation element 3[0.6, 0.7]] or the like using the degree of similarity with the assembly operation element in each classification.

By doing as described above, the vector data is generated and vector data is sequentially generated with respect to the pieces of cut out sensor data to generate a matrix as a set of the pieces of cut out sensor data.

For example, from three pieces of cut out sensor data, a matrix of [:assembly operation element 1 [0.3,0.2]: assembly operation element 2 [0.1, 0.2]:assembly operation element 3[0.6, 0.7]]

[:assembly operation element 1 [0.3, 0.2]:assembly operation element 2 [0.1, 0.2]:assembly operation element 3 [0.6, 0.7]]

[:assembly operation element 1 [0.3, 0.2]:assembly operation element 2 [0.1, 0.2]:assembly operation element 3 [0.6, 0.7]] is generated. In the matrices, an assembly operation element having the highest degree of similarity is extracted.

An assembly operation element having the highest degree of similarity among [:assembly operation element 1 [0.3, 0.2]:assembly operation element 2 [0.1, 0.2]: assembly operation element 3[0.6, 0.7]] is the assembly operation element 3 [0.6, 0.7] and thus, the assembly operation element 3 is extracted from each piece of vector data. The extracted assembly operation element is reconfigured as sequence information and the assembly operation element 3 the assembly operation element 3 the assembly operation element 3 is finally obtained.

By doing as described above, when the assembly operation element as the sequence information is extracted from sensor data, the assembly operation element is compared with sequence information obtained from ontology data of the image forming apparatus assembly so as to make it possible to determine whether an assembly operation is performed along with ontology data or not, that is, detect a failure during the product assembly.

Figure 17:
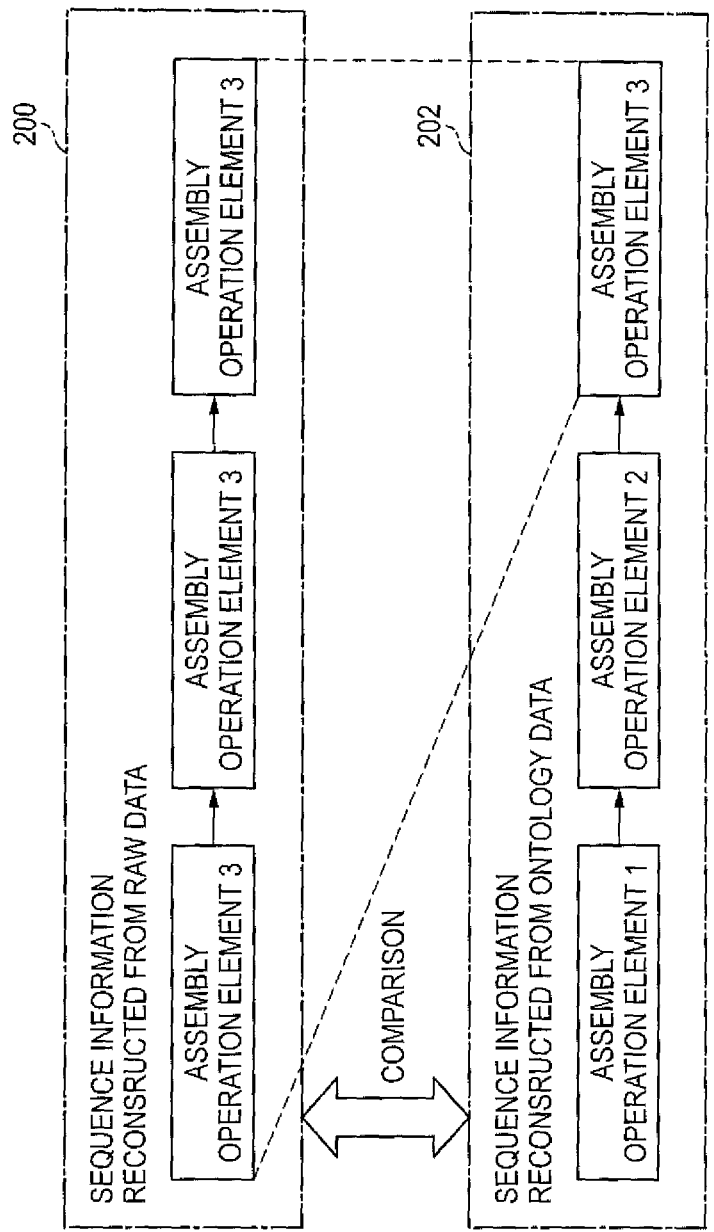
FIG. 17 is an explanatory diagram (first) of a comparison of sequence information of RAW data and ontology data.

FIG. 17 schematically illustrates matching of sensor data with assembly information. Sequence information 200 reconfigured from data obtained by cutting out sensor data (RAW) from the sensor 10 into a window W is compared with sequence information 202 reconfigured from ontology data of the image forming apparatus assembly and an assembly operation element which is the closest to a piece of sequence information among pieces of sequence information 202 reconfigured from ontology data is extracted. In a case of FIG. 17, sequence information 200 obtained by being reconfigured from RAW data is the assembly operation element 3 the assembly operation element 3 the assembly operation element 3 and an assembly operation element which is the closest to a piece of sequence information among pieces of sequence information 202 is the assembly operation element 3. Accordingly, it may be determined that RAW data means the assembly operation element 3 in ontology data. In FIG. 17, a correspondence between the sequence information 200 and the sequence information 202 is represented by a dotted line.

Figure 18:
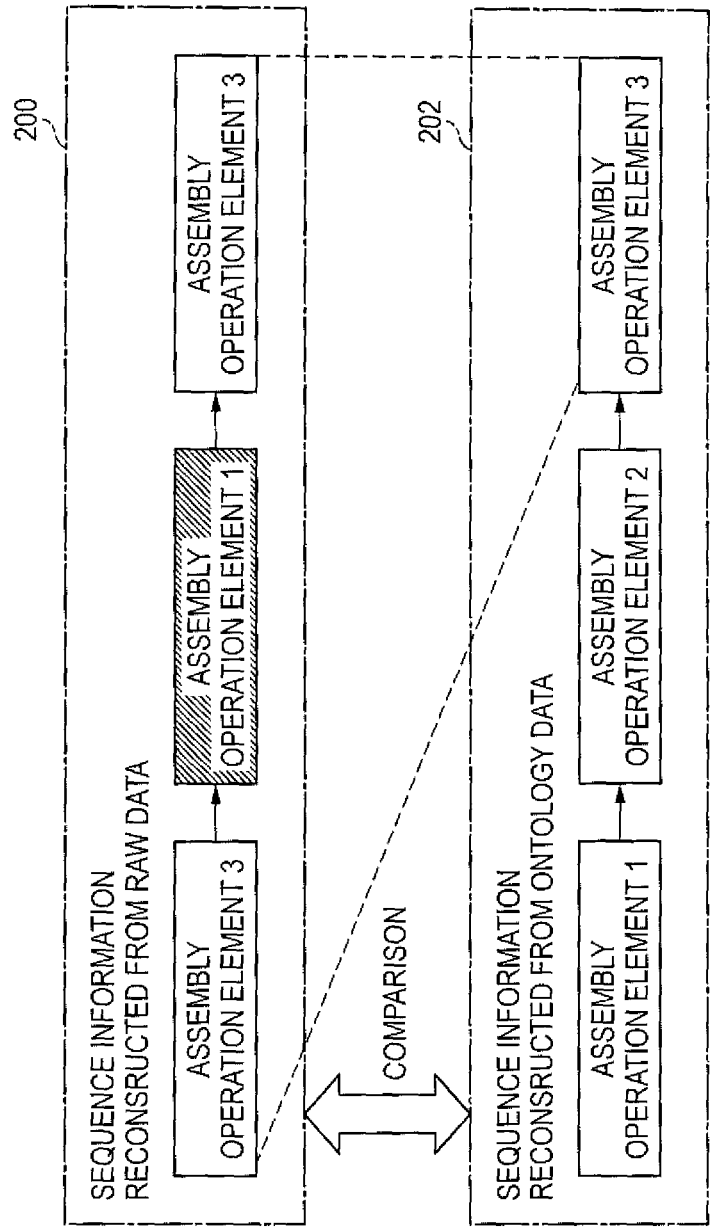
FIG. 18 is an explanatory diagram (second) of the comparison of sequence information of RAW data and ontology data.

FIG. 18 illustrates another example of sequence information 200 reconfigured from RAW data.

In this example, it becomes that the assembly operation element 3→the assembly operation element 1→the assembly operation element 3 and the assembly operation element 1 is included between two assembly operation elements 3. In theory, although it is to be the assembly operation element 3 as a result of a comparison with the sequence information 202 obtained by being reconfigured from ontology data, when the assembly operation element 1 different from the assembly operation element 3 is included, it is estimated that a failure occurs in the assembly operation element 1 which is meant by RAW data and a failure may be output.

When sensor data is cut out into the window W, a timestamp may be given to each window to give time information to each piece of cut out sensor data. With this, a failure of the product assembly time may be detected. When description is made based on FIG. 17, time information is given to each of the assembly operation elements 3 constituting the sequence information 200 reconfigured from RAW data.

Then, time information is given to sequence information 200 and a required time for a series of sequence of the assembly operation element 3→the assembly operation element 3→the assembly operation element 3 is obtained.

When time information is also given to sequence information 202 reconfigured from ontology data similarly, the required time of both the sequence information 200 and the sequence information 202 may be compared to estimate a length of the required time of RAW data to the required time of ontology data, a variation degree of the required time itself of RAW data, or the like. It may be determined that when the required time of RAW data is excessively long, a failure is present in the product assembly time and also when the variation degree of the required time itself of RAW data is excessively large, a failure is present in the product assembly time. Regarding the variation degree of the required time, the degree of skill may also be evaluated for each assembly worker.

As described above, the assembly operation element obtained from sensor data is compared with the assembly operation element obtained from ontology data so as to make it possible to evaluate whether an assembly worker assembles a product in a correct procedure or in desired required time and output the result of evaluation. Such an output is fed back to an assembly worker to enable more efficient and reliable product assembly.

Figure 19:
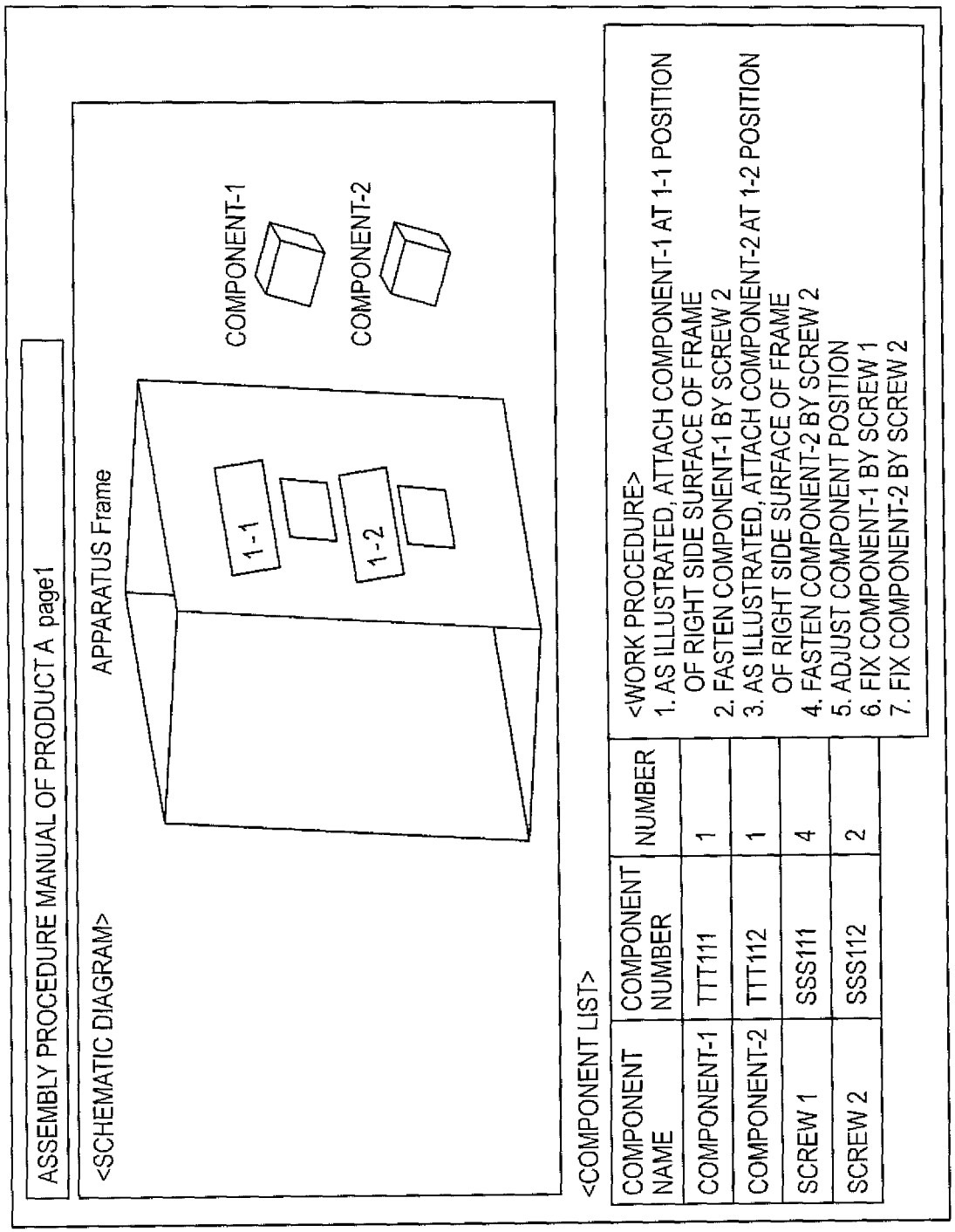
FIG. 19 is a diagram for illustrating a specific example of an assembly procedure manual.

FIG. 19 illustrates a specific example of an assembly procedure manual of an image forming apparatus (product A). A schematic diagram and a component list will be described and a work procedure is further described. The work procedure is, 1. As illustrated, attach component-1 at 1-1 position of the right side surface of frame; 2. Fasten component-1 by screw 2; 3. As illustrated, attach component-2 at 1-2 position of the right side surface of frame; 4. Fasten component-2 by screw 2; 5. Adjust component position; 6. Fix component-1 by screw 1; and 7. Fix component-2 by screw 2.

Figure 20:
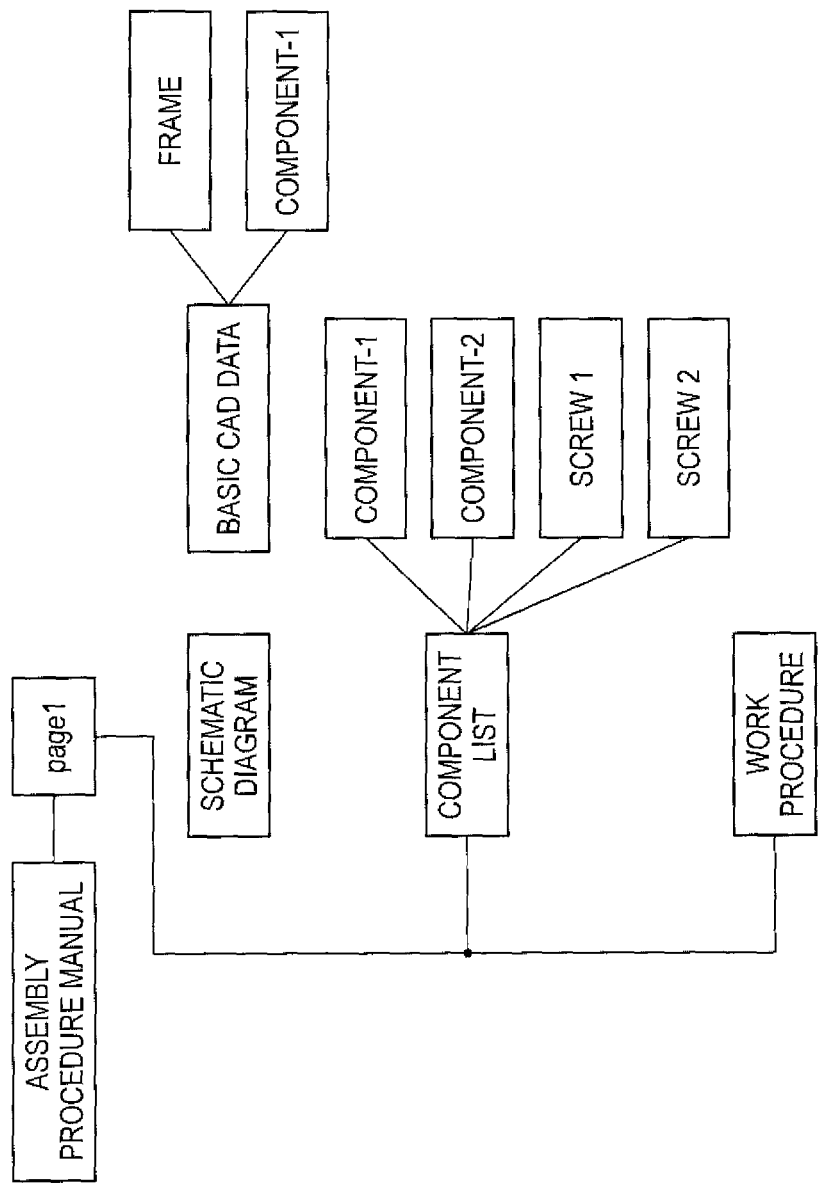
FIG. 20 is an explanatory diagram of ontology data of the assembly procedure manual.

FIG. 20 illustrates ontology data of the assembly procedure manual illustrated in FIG. 19.

In page 1 of the assembly procedure manual, a schematic diagram, a component list, and a work procedure are included, basic 3D CAD data is included in the schematic diagram, and a frame and a component are included in the 3D CAD data.

In the component list, a component 1-1, a component 1-2, a screw 1, and a screw 2 are included.

In the work procedure, a specific work procedure is included.

Figure 21:
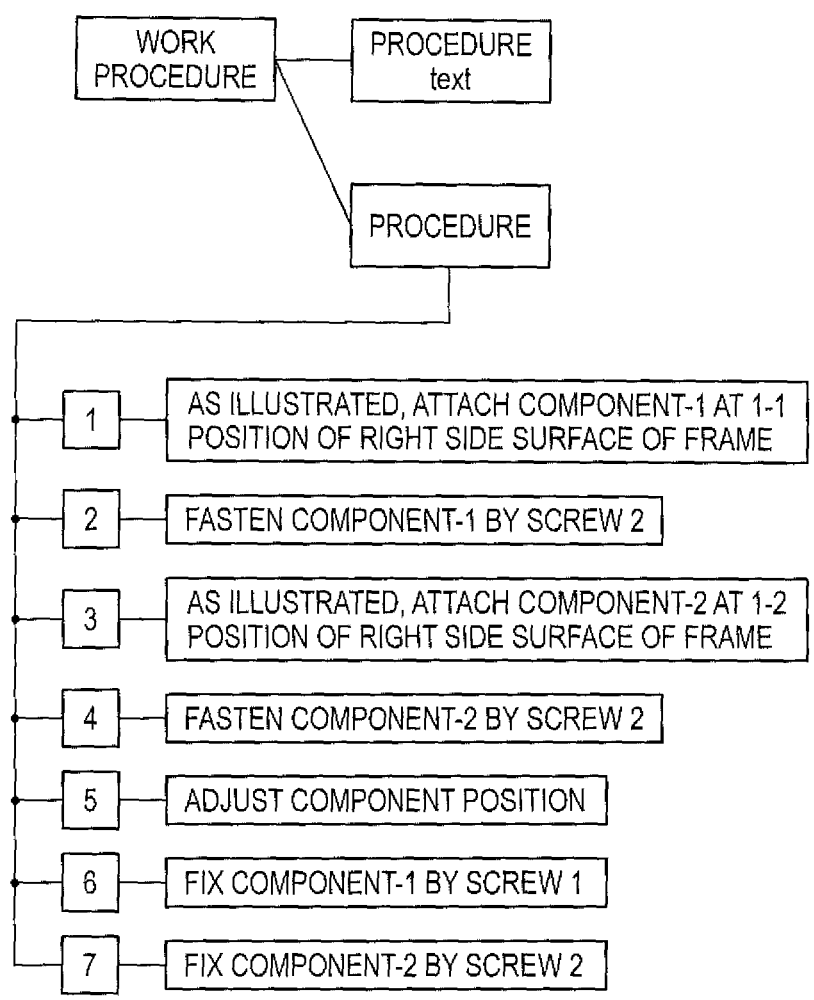
FIG. 21 is an explanatory diagram (first) of ontology data of a work procedure.

FIG. 21 illustrates ontology data of the work procedure.

In the work procedure, a procedure text and a procedure are included. In the procedure, Procedure 1 to Procedure 7 are included, and matters of respective procedures are the same as those in the work procedure. That is, Procedure 1: As illustrated, attach component-1 at 1-1 position of the right side surface of frame; Procedure 2: Fasten component-1 by screw 2; Procedure 3: As illustrated in, attach component-2 at 1-2 position of the right side surface of frame; Procedure 4: Fasten component-2 by screw 2; Procedure 5: Adjust component position; Procedure 6: Fix component-1 by screw 1; and Procedure 7: Fix component-2 by screw.

Figure 22:
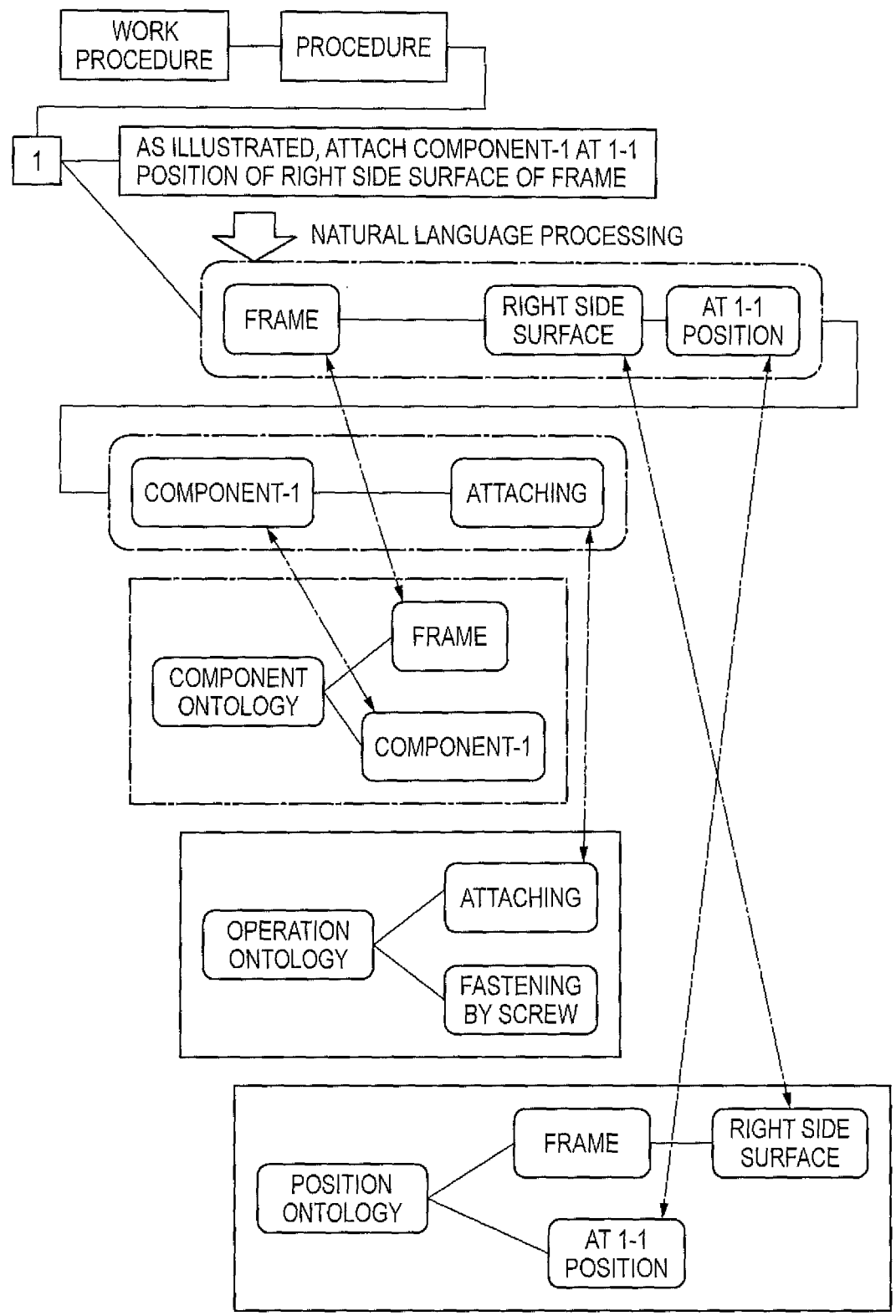
FIG. 22 is an explanatory diagram (second) of ontology data of the work procedure.

FIG. 22 is still another example of work procedure ontology data.

Procedure 1: As illustrated, perform natural language processing on attaching of component-1 at 1-1 position of the right side surface of frame, that is, perform a morpheme analysis and a dependency analysis to analyze, frame/right side surface/at 1-1 position/component-1/attaching.

When a "frame" and a "component-1" are included as component ontology data of an image forming apparatus (product A), the "frame" of the ontology data is subjected to matching with a "frame" obtained by being subjected to natural language processing and the "component-1" of the ontology data is subjected to matching with a "component-1" obtained by being subjected to natural language processing.

Similarly, when an "attaching" and "fastening by screw" are included as operation ontology data of the image forming apparatus (product A), the "attaching" of the ontology data is subjected to matching with a "attaching" obtained by being subjected to natural language processing.

When a "frame", a "right side surface", and a "at 1-1 position" are included as position ontology data of the image forming apparatus (product A), the "right side surface" of the ontology data is subjected to matching with a "right side surface" obtained by being subjected to natural language processing and the "at 1-1 position" of the ontology data is subjected to matching with the "at 1-1 position" obtained by being subjected to natural language processing. In FIG. 22, an alternate long and short dash line arrow schematically illustrates matching processing for matters described above.

Thus, although exemplary embodiments of the present invention are described, the present invention is not limited thereto and various changes may be made thereto.

For example, in the present exemplary embodiment, although key information is uniquely given to sensor data from the sensor 10 in the sensor and actuator control module 14 and the sensor data is used as the RAW data of a key/value, the key information is uniquely given in the sensor 10 to be supplied to the sensor and actuator control module 14 with wired or wireless connections. The sensor and actuator control module 14 stores the RAW data of received key/value in the Redis data store 16.

In the present exemplary embodiment, although a single piece of key information is given to a single data stream, a single piece of key information may also be given to plural data streams.

In the present exemplary embodiment, in the second step, although the data stream to which the key information is given is processed by in the CEP engine, a data stream to which the key information is not given may also be supplied to the CEP engine in addition to the data stream to which the key information is given and both the data streams to which the key information is given and to which the key information is not given may be processed in combination.

Furthermore, in the present exemplary embodiment, although the key information is inferred in the service module 18 and a data stream including key information corresponding to the inferred key information is selected, the service module 18 may supply the received query to the RDF store 22, the RDF store 22 may infer key information and return the key information to the service module 18, and the service module 18 may select a data stream including key information corresponding to the acquired key information. In this case, it may be said that the first step is executed through cooperation of the service module 18 and the RDF store 22.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing system comprising:
   a storage device storing work procedure ontology data generated from a work procedure manual subjected to natural language processing, a series of assembly operation elements being connected in an order of the work procedure manual; and
   a processor configured to:
     partition first sensor data into data pieces;
     associate each data piece of the partitioned first sensor data with each assembly operation element of the series of assembly operation elements;
     determine a set of learning data by performing machine learning using the partitioned first sensor data as a teacher data set;
     calculate a degree of similarity between the learning data and each assembly operation element of the series of assembly operation elements;
     compare second sensor data sequentially obtained from a sensor installed in an assembly process with the learning data to extract an assembly operation element with a highest degree of similarity from the series of assembly operation elements;
     reconfigure the extracted assembly operation element with the highest degree of similarity as first sequence information;
     reconfigure the work procedure ontology data into second sequence information;
     compare the first sequence information with the second sequence information; and
     in response to the extracted assembly operation element reconfigured as the first sequence information being different from an assembly operation element in the second sequence information, output a result indicating a failure.

2. The data processing system according to claim 1, wherein the processor is further configured to:
   determine the assembly operation element of the series of assembly operation elements using the work procedure ontology data; and
   extract second sensor data corresponding to the determined assembly operation element.

3. The data processing system according to claim 1, wherein:

the storage device is configured to store a data processing routine template associated with the work procedure ontology data, and the processor is configured to select a data stream and process the selected data stream abased on the data processing routine template.

4. The data processing system according to claim 1, wherein:

time information is included in data obtained by cutting out the second sensor data into a time window having a predetermined time period, and the processor is configured to use the first sequence information and the second sequence information to detect a failure of a product assembly time.

5. A data processing method comprising:

storing work procedure ontology data generated from a work procedure manual subjected to natural language processing, a series of assembly operation elements being connected in an order of the work procedure manual;

partitioning first sensor data into data pieces associating each data piece of the partitioned first sensor data with each assembly operation element of the series of assembly operation elements;

determining a set of learning data by performing machine learning using the partitioned first sensor data as a teacher data set;

calculating a degree of similarity between the learning data and each assembly operation element of the series of assembly operation elements;

comparing second sensor data sequentially obtained from a sensor installed in an assembly process with the learning data to extract an assembly operation element with a highest degree of similarity from the series of assembly operation elements;

reconfiguring the extracted assembly operation element with the highest degree of similarity as first sequence information;

reconfiguring the work procedure ontology data into second sequence information;

comparing the first sequence information with the second sequence information; and in response to the extracted assembly operation element reconfigured as the first sequence information being different from an assembly operation element in the second sequence information, outputting a result indicating a failure.

\* \* \* \* \*